Dec. 18, 1962  W. STELLMACHER  3,069,298
PROCESS FOR CUTTING METAL BLOCKS
Filed May 9, 1960
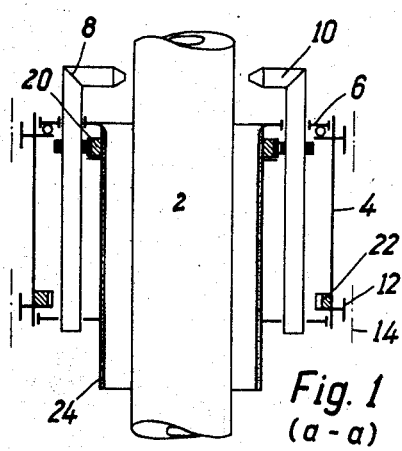
Fig. 1 (a-a)
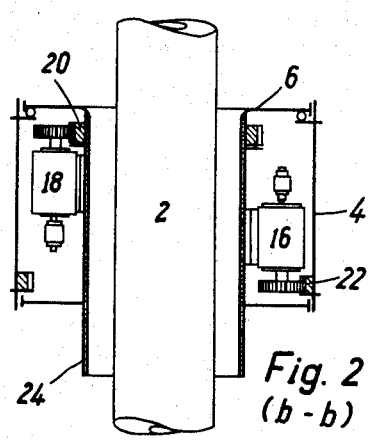
Fig. 2 (b-b)
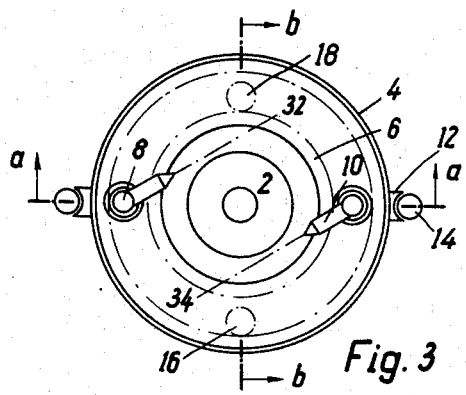
Fig. 3
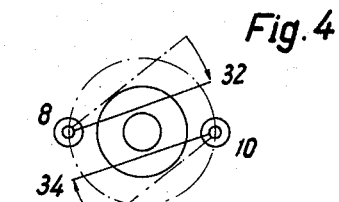
Fig. 4
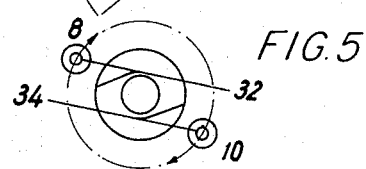
FIG. 5
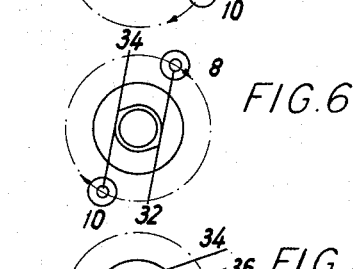
FIG. 6
FIG. 7
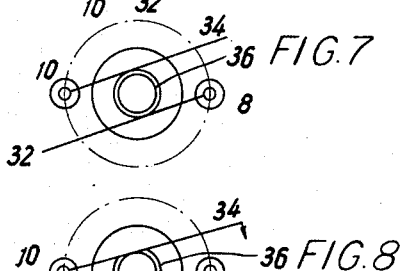
FIG. 8
FIG. 9
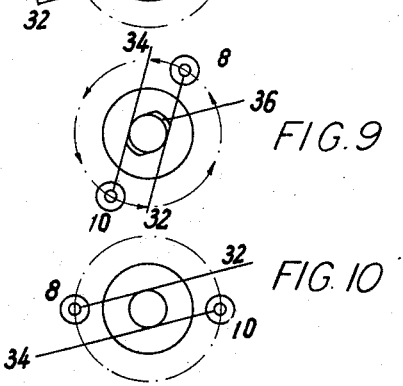
FIG. 10
Inventor
Wilhelm Stellmacher
By his attorneys
Howson and Howson

United States Patent Office 3,069,298
Patented Dec. 18, 1962

3,069,298
PROCESS FOR CUTTING METAL BLOCKS
Wilhelm Stellmacher, Dusseldorf, Germany, assignor to Mannesmann Aktiengesellschaft, Dusseldorf, Germany, a German company
Filed May 9, 1960, Ser. No. 27,630
Claims priority, application Germany May 15, 1959
1 Claim. (Cl. 148—9)

The subject of the invention is a process and an apparatus for the autogenous burning through or cutting apart of metal hollow blocks, which have thick walls, and which may be produced by the continuous-casting process or in some other manner. Such blocks usually have a round or polygonal cross section. Special requirements are applied to their outer and inner surfaces because they are often subjected to further processing. It is therefore necessary, particularly for the lengthy hollow blocks produced by the continuous-casting process, to subdivide them into short pieces capable of being processed separately. This cutting can be done with the block in the hot state or in the cold state, and it is often done with cutting burners. While in this case it is relatively easy to remove the welding slag adhering to the outer surface, it is of considerable importance that the surface of the internal hollow in particular be free of steel mixed or alloyed with welding slag. This is so because such material can be removed only with difficulty and at an extra cost, and the material adheres in substantial amounts when such hollow objects are cut apart with cutting burners. With this method of cutting apart, the burner flame, as is well known, drives the molten and partly-slag-contaminated material ahead of it and, with hollow objects, into the corresponding region of the hollow space, where it adheres in thick droplike beadings or ridges. Under certain circumstances this completely plugs up the hollow at the end under consideration.

For the purpose of avoiding this considerable drawback, it is now suggested, in accordance with the invention, the procedure in cutting apart thick-walled hollow objects be such that, by means of two or more autogenous cutters that travel round the circular or polygonal block, the mass or bulk of the wall be burned away with a tangential cut. This is so done that only a thin-walled remainder of the wall is left in a continuous annular surrounding of the hollow space, this thin-walled remainder preventing welding slag from running into the hole in the object. This thin-wall remainder is burned through only after the bulk of the wall material together with the welding slag has been burned away and driven to the exterior by the aid of the burner or burners. Because this wall remainder can be kept relatively thin, at the most only a relatively small portion of the welding slag can reach the hollow space and adhere there. For the purpose of keeping even this amount as small as possible, it is further suggested the burner or burners be guided in such a way that the wall remainder also is cut off tangentially. In fact, by this means only a fraction of the welding slag produced at the second step arrives in the hollow space.

The mechanism associated with this process has essentially one or a plurality, preferably two, of known cutting burners, that are disposed opposite one another in a cylindrical housing surrounding the hollow block. They are so mounted as to be able to pivot and also to run round in a circular path. Servomotors cause both the pivoting of the burner nozzles and also the running of the burners round the housing. The housing can if required be provided at the side of it turned toward the hollow block or length with a jacket through which a cooling medium flows. The design of the housing should preferably be such that it can be set to be used both in a vertical and also in a horizontal position.

The drawing shows by way of example a mechanism for use in conjunction with the method according to the invention, this mechanism being generally intended for vertical use in continuous-casting equipment.

FIGS. 1 and 2 show the mechanism in vertical section in two different planes 90° apart, taken along lines a—a and b—b respectively of FIG. 3.

FIG. 3 shows the mechanism in plan.

FIGS. 4 to 10 are diagrammatic showings of the burners of FIGS. 1 to 3 at various stages in their cycle of movement. FIG. 4 shows the two burners turned clockwise into operating position tangential to the block such that they have burned through the block on opposite sides leaving only a thin wall at those points.

FIGS. 5, 6 and 7 show the burners in the next stage of moving around the longitudinal axis of the block and cutting the block to a thin wall all around, FIG. 5 showing after about 60° of movement, FIG. 6 after about 120° and FIG. 7 after 180° where the wall is thinned all around.

FIG. 8 shows the burners in the new 180° position turned a few degrees further in about their own axes till at those points they have cut through the remaining wall to the hollow space in the block.

FIG. 9 shows the conditions after the burners set about their own axes as in FIG. 8 and have started a return or counter-clockwise rotation around the longitudinal axis of the block thus removing the thin-wall remainder around more of the block.

FIG. 10 shows the two burners returned to their original position around the block and the entire thin-wall removed.

In the embodiment shown in the drawings the housing surrounding the length of metal 2 consists of the outer stationary and supporting casing 4 and of the inner and rotating part 6. In this housing are arranged the burner nozzles, set opposite one another and directed angularly at the length of metal 2. In the present case the casing 4 is piloted by sliders 12 in guideways 14, and is adjustable in height for the case under consideration. Of the motors 16 and 18 (FIG. 2) also disposed in the housing, the motor 18 has the function of pivoting the burners 8 and 10 about their own axes through a certain range by means of a ring gear 20; while the motor 16 by means of the ring gear 22 produces the rotation of the inner part 6 and of the inwardly-pivoted burners 8 and 10 (FIG. 3) around their common center (the longitudinal axis of the block) and the length of metal 2. At the side turned toward the metal length 2, the rotating part 6 has a double jacket 24, through which a cooling medium flows. This cooled jacket 24 should, moreover, have a length of such dimensions that the supply lines for the burners for feeding electric current to the motors, and for the inflow and outflow of the cooling water, shall not be able to come into contact with the still-hot length of metal 2 if these elements become wound up during the rotational motion of the jacket.

The way in which this mechanism works is as follows:

For the purpose of cutting off a section from the round length of metal 2 illustrated in the drawing, the two burners 8 and 10 set opposite one another are pivoted about their own axes with the aid of the motor 18 and the ring gear 20 until their burner flames 32 and 43 contact the length of metal 2 tangentially. After the length of metal has become heated up, the two burners are pivoted farther until the length of metal at both the sides where the burners are acting is burned through except for a thin wall left outside the hollow space in the length of metal 2 (see FIG. 4). When this is achieved, the pivoting motion of the burners is terminated. Now the motor 16, through the intermediary of the ring 22, starts the rotational motion of the burners 8 and 10, by means of which these burners are carried each 180° round the length of metal 2. In this way, as is shown in FIGS. 5 and 6, the bulk of the wall material becomes burned away and conveyed outward, whereby finally, in the terminal position of the two burners (see FIG. 7), there is left standing only the thin-walled remainder 36 going annularly round the hollow space. Now there is repeated on a smaller scale the operation described in the foregoing, in that in the first place the two burners, whose flames are tangent to the annular remainder of the wall are, by the aid of the motor 18 and through the intermediary of the ring gear 20, pivoted a few additional degrees about their own axes until the remainder is cut through as far as the hollow space. Then, the motor 16 by means of the ring gear 22 starts the return motion (FIG. 9), and carries the burners 8 and 10 back to their original position (FIG. 10), and in doing this burns away the remainder 36 of the wall.

The mechanism can, in a known manner, be disposed inside a continuous-casting mechanism in such a way that it is carried downward along with the length of metal being cast while the length-cutting operation is being carried out.

It will be obvious that the drive of the rotating parts and of the burners can be carried out manually or mechanically by the aid of known adjusting motors, specified-value transmitting devices and/or other known controlling devices.

What is claimed is:

A process for the autogenous cutting apart of thick walled hollow metal blocks comprising the steps in sequence of aiming at least two autogenous cutters tangentially to the wall of the block, about their individual axes, preparatory to cutting a thin wall remainder out of a thick walled hollow metal block, rotating the cutters around the longitudinal axis of the thick walled hollow metal block in one direction around the outside of said block, the motion being relative to the block, to leave only a complete thin wall remainder, thereafter changing the pivotal adjustment of the cutters about their individual axes to effect a second tangential cutting, aimed at the inner wall of the block, cutting away a portion of the thin wall remainder, and rotating the cutters around the longitudinal axis of the thick walled hollow metal block in the direction opposite to that of the first rotation around the longitudinal axis of the said block to complete the cutting away of the thin wall remainder;

whereby breakthrough of the cut to the hollow inside of the block is delayed until the third step by which time the tangentially aimed cutters have blown away a majority of any contaminating slag.

References Cited in the file of this patent

UNITED STATES PATENTS

| | | |
|---|---|---|
| 1,885,107 | Brown | Nov. 1, 1932 |
| 2,221,788 | Doyle | Nov. 19, 1940 |
| 2,417,412 | Herbst | Mar. 18, 1947 |
| 2,556,786 | Anderson | June 12, 1951 |

FOREIGN PATENTS

| | | |
|---|---|---|
| 701,786 | France | Mar. 23, 1931 |